April 1, 1952  R. HOEBEKE  2,590,860
REMOVABLE PIPE PLUG
Filed Dec. 1, 1947

INVENTOR.
ROBERT HOEBEKE
By  *m. a. Hayes*
ATTORNEY

Patented Apr. 1, 1952

2,590,860

UNITED STATES PATENT OFFICE 2,590,860

REMOVABLE PIPE PLUG

Robert Hoebeke, Medford, Mass.

Application December 1, 1947, Serial No. 789,009

5 Claims. (Cl. 138—90)

(Granted under the act of March 3, 1883, as amended April 30, 1928; 370 O. G. 757)

The present invention relates in general to the art of pressure seals and more particularly provides an efficient and novel removable plug for pipe system testing and sealing that can withstand appreciable liquid and gaseous pressures.

Heretofore, test plugs for determining the pressure characteristics of a piping system, employed an arrangement whereby an externally and manually applied force axially compressed and radially expanded some resilient material positioned in a normally open pipe end, thereby sealing the pipe. This application of external force often proves to be a disadvantage, in that the amount of force, required to provide sufficient radial expansion of the resilient material is not known. If too much force is applied then the pipe may be deformed; and if there is a lack of applied force, then the plug may not be well secured and hence unable to withstand the pressure applied in the pipe.

Therefore, this invention has as a primary object the provision of a simplified pipe plug wherein an externally applied force is unnecessary for operation.

Another object of the present invention is to provide a test or temporary seal for a pipe system which is capable of withstanding considerable fluid pressures and in which the gripping force between plug and pipe is automatically adjusted to meet the forces imposed by the fluid pressure.

A further object of this invention is to provide a temporary and removable pipe seal which features an economy of parts and lack of complexity.

Figure 1:
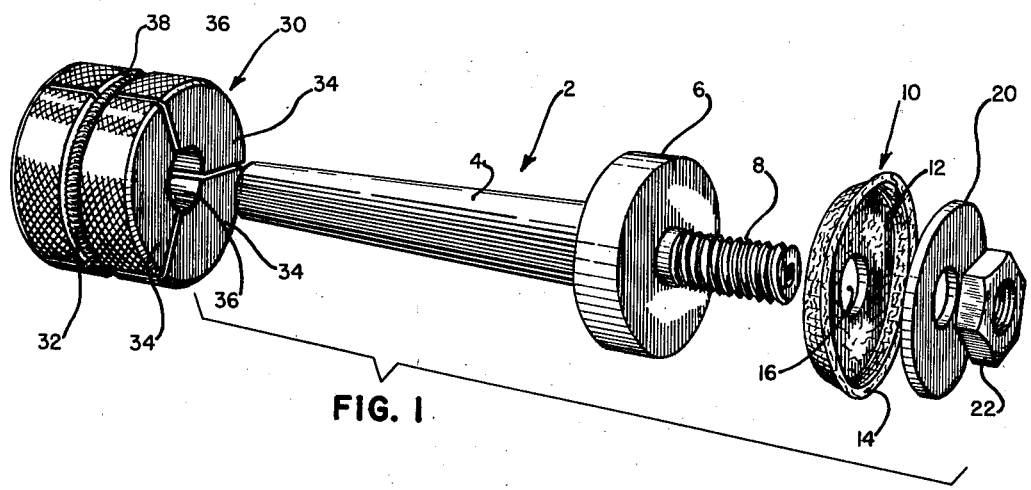
Figure 2:
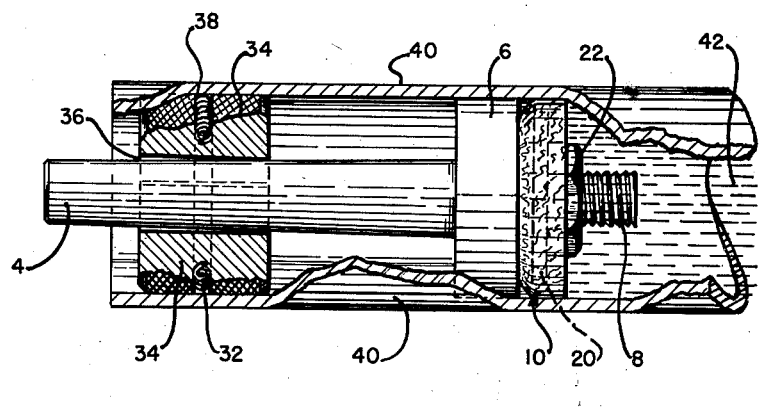

These and other objects of this invention will now become apparent from the following detailed specification taken in connection with the accompanying drawings in which:

Fig. 1 shows an axially exploded view of the elements of the pipe plug comprising this invention; and Fig. 2 shows the assembled, removable pipe plug in operative position within a pipe and withstanding an applied liquid pressure.

Referring now to Fig. 1, there is shown a test plug, which includes a hardened steel body portion 2, which in itself consists of a long slightly tapered shank 4 having the smallest diameter at its free end, an axial cylindrical plunger 6, and an axial threaded extension 8. Body portion 2 is preferably turned on a lathe from a single piece of stock. For extremely large diameter plugs and for economy of metal, body portion 2 may be assembled from a number of individually machined parts, or may be cast as one unit, and then machined. Plunger 6 has a diameter that will permit a sliding fit along the inside of the pipe to be tested.

The test plug also includes a cup washer 10, preferably made of a flexible gasket material such as leather. The washer 10 is formed with a flat central portion 12, having a central opening 16 and a circular lip 14. This cup washer 10 is adapted to fit snugly over threaded extension 8, with its central flat portion 12 against plunger 6 and with lip 14 directed away from plunger 6. When the test plug is not in use, the cup washer 10 has substantially the same outer diameter as that of plunger 6.

A rigid metal washer 20, with a central opening of the same diameter as opening 16 in cup washer 10, and an outer diameter approximately that of the flat portion 12 of cup washer 10, is adapted to fit over the threaded portion 8 and bear against cup washer 10. A nut 22, when tightened on threaded portion 8, secures the cup washer 10 through washer 20 firmly to plunger 6. The assembled relation of the components just described is clearly illustrated in Fig. 2.

With reference now to Figs. 1 and 2, there is shown a gripping member 30 adapted for a sliding fit on shank 4. The structural details thereof are best described by discussing one method of machining this member. A cylinder of the proper diameter is first cut from round stock and axial opening 36 is bored therein. Axial opening 36 may be reamed so that it tapers conforming to the taper of shank 4. The outer diameter of the stock used has an outer diameter that is somewhat less than the inner diameter of the pipe to be tested. The diameter of bore 36 is approximately the same as the diameter of tapered shank 4 at its free end. An annular 38 groove is turned centrally on the outer cylindrical surface of gripping member 30. The outer surface of gripping member is knurled or otherwise roughened for insuring a firm grip, and thereafter the cylinder is cut radially to form a number of segments 34. Although three segments 34 are shown, the number may be altered to suit conditions of operation. A garter spring 32 is then placed into the groove 38 formed in the segments 34, and thereby resiliently holds them in the relation shown. The depth of groove 38 is such that garter spring 32 is wholly within the outer cylindrical, knurled surfaces of the segments 34.

Application of the removable test plug of the present invention is extremely simple. Referring now to Fig. 2, the assembled plug is shown as inserted into the pipe 40 to be tested. Prior to the introduction of fluid 42, gripping member 30 is held in place by hand. The fluid 42 is then introduced to the pipe system and pressure slowly applied. The first effect of the applied fluid 42 is to act upon the lip 14 of the cup washer 10 to seal the lip radially to the inner wall of the pipe 40. Also the fluid pressure acting upon plunger 6 drives the tapered shank 4, toward the open end of the pipe, thereby expanding the gripping member 30 radially outward to "bite" securely the inner wall of the pipe 40. Clearly, the "biting" effect is directly proportional to the pressure applied whereby the strength of the grip is automatically compensated with pressure changes.

A removable pipe plug as described in the present application in an actual test on a 1½" pipe, withstood 2,000 lbs. per sq. in. pressure, and gave no indication that much higher pressures could not be applied.

After the test and release of the fluid pressure, the removable pipe plug can be easily removed by tapping the free end of the shank 4 with a hammer, to drive the tapered shank 4 to the right as viewed in Fig. 2, and thus permit the garter spring 32 to contract the segments 34 and permit removal of the plug.

It is apparent that many modifications of the present invention may be made by those skilled in the art. Thus, it is preferred that the scope of this invention be limited only to the subject matter of the appended claims.

The invention described herein may be manufactured and used by or for the Government of the United States of America for government purposes without the payment of royalty thereon or therefor.

I claim:

1. A removable seal for pressure testing of pipe comprising, a body portion having a substantially cylindrical plunger adapted to slide within a pipe to be tested and a tapered shank extending therefrom; a substantially cylindrical gripping member slidably and removably fitted to said tapered shank, said gripping member being arranged for expansion or contraction in response to sliding movement thereof relative to said tapered shank, said gripping member being formed of a plurality of radially separated gripping segments, said segments maintained in substantially cylindrical relationship by a resilient band encircling said segments, said band lying wholly within the outer substantially cylindrical surface of said gripping member, said outer substantially cylindrical surface of said gripping member being roughened for securely "biting" the inside of the wall of the pipe being tested; and a cup shaped washer having a flat portion thereof in contacting relation with said plunger on the side opposite said tapered shank, and a circular lip extending from said flat portion and directed away from said plunger.

2. A removable seal for the pressure testing of pipe comprising, a body portion having a substantially cylindrical plunger adapted to slide within a pipe to be tested and a tapered shank extending therefrom, a substantially cylindrical gripping member slidably and removably fitted to said tapered shank, said gripping member being arranged for expansion and contraction in response to sliding movement thereof relative to said tapered shank and a sealing member secured to said plunger, said sealing member extending beyond the perimeter of said plunger and being adapted to form a fluid tight seal between said perimeter and the wall of said pipe to be tested.

3. A removable seal for the pressure testing of pipe comprising, a body portion having a substantially cylindrical plunger adapted to slide within a pipe to be tested and a tapered shank extending therefrom, a substantially cylindrical gripping member slidably and removably fitted to said tapered shank, said gripping member being arranged for expansion or contraction in response to sliding movement thereof relative to said tapered shank, said gripping member being formed of a plurality of radially separated gripping segments maintained in substantially cylindrical relationship by a resilient band encircling said segments, said band lying wholly within the outer substantially cylindrical surface of said gripping member, said outer substantially cylindrical surface of said gripping member being roughened for securely "biting" the inside of the wall of the pipe to be tested, and a sealing member secured to said plunger, said sealing member extending beyond the perimeter of said plunger and being adapted to form a fluid tight seal between said perimeter and the wall of said pipe to be tested.

4. A removable seal for the pressure testing of pipe comprising, a body portion having a substantially cylindrical plunger adapted to slide within a pipe to be tested and a tapered shank extending therefrom, a substantially cylindrical gripping member slidably and removably fitted to said tapered shank and arranged for expansion or contraction in response to sliding movement thereof relative to said tapered shank and a cup shaped washer having a flat portion thereof in contacting relation with said plunger on the side opposite said tapered shank and having a circular lip extending from said flat portion and directed away from said plunger.

5. A removable seal for pressure testing of pipe comprising, a body portion having a substantially cylindrical plunger adapted to slide within a pipe to be tested and a tapered shank extending therefrom, a substantially cylindrical gripping member slidably and removably fitted to said tapered shank and arranged for expansion or contraction in response to sliding movement thereof relative to said tapered shank, said gripping member being formed of a plurality of radially separated gripping segments maintained in substantially cylindrical relationship by a resilient band encircling said segments, said band lying wholly within the outer substantially cylindrical surface of said gripping member, said outer substantially cylindrical surface of said gripping member being roughened for securely "biting" the inside of the wall of the pipe to be tested, a cup-shaped washer of flexible material formed with a flat portion and a circular lip extending from said flat portion and a rigid washer, said cup-shaped washer at one of its sides in the region of its flat portion being maintained in contacting relation with said plunger at the side of said plunger opposite said tapered shank, said cup-shaped washer at the other of its sides in the region of its flat portion being maintained in contacting relation with said rigid washer, said circular lip of said cup-shaped washer being directed away from said plunger.

ROBERT HOEBEKE.

REFERENCES CITED

The following references are of record in the file of this patent:

UNITED STATES PATENTS

| Number | Name | Date |
|---|---|---|
| 521,835 | Tillinghast | June 26, 1894 |
| 1,463,824 | Leuvelink | Aug. 7, 1923 |
| 1,528,185 | Diederick | Mar. 3, 1925 |
| 1,700,091 | Bruce | Jan. 22, 1929 |
| 2,329,801 | Wellborn | Sept. 21, 1943 |